(12) United States Patent
Jaeger et al.

(10) Patent No.: US 11,358,411 B2
(45) Date of Patent: Jun. 14, 2022

(54) WHEEL MADE OF FIBER-REINFORCED COMPOSITE MATERIAL AND PROVIDED WITH GALVANIC ISOLATION

(71) Applicants: Bayerische Motoren Werke Aktiengesellschaft, Munich (DE); ThyssenKrupp Carbon Components GmbH, Kesselsdorf (DE)

(72) Inventors: Elmar Jaeger, Munich (DE); Jens Werner, Coswig (DE); Michael Dressler, Dresden (DE)

(73) Assignees: Bayerische Motoren Werke Aktiengesellschaft, Munich (DE); ThyssenKrupp Carbon Components GmbH, Kesselsdorf (DE)

( * ) Notice: Subject to any disclaimer, the term of this patent is extended or adjusted under 35 U.S.C. 154(b) by 362 days.

(21) Appl. No.: 16/455,979

(22) Filed: Jun. 28, 2019

(65) Prior Publication Data

US 2019/0315155 A1 Oct. 17, 2019

Related U.S. Application Data

(63) Continuation of application No. PCT/EP2017/081978, filed on Dec. 8, 2017.

(30) Foreign Application Priority Data

Feb. 27, 2017 (DE) ...................... 10 2017 203 172.7

(51) Int. Cl.
*B60B 3/14* (2006.01)
*B60B 5/02* (2006.01)

(52) U.S. Cl.
CPC .................. *B60B 3/14* (2013.01); *B60B 5/02* (2013.01); *B60B 2360/10* (2013.01);
(Continued)

(58) Field of Classification Search
CPC .................. B60B 3/14; B60B 2360/10; B60B 2360/3412; B60B 2360/3418; B60B 2900/141; B60Y 2200/12
See application file for complete search history.

(56) References Cited

U.S. PATENT DOCUMENTS

2011/0089749 A1   4/2011   Kleber et al.
2014/0346845 A1   11/2014  Renner
(Continued)

FOREIGN PATENT DOCUMENTS

CN    105393869 A      3/2016
DE    202 12 744 U1    2/2004
(Continued)

OTHER PUBLICATIONS

International Search Report (PCT/ISA/210) issued in PCT Application No. PCT/EP2017/081978 dated Feb. 26, 2018 with English translation (eight pages).
(Continued)

*Primary Examiner* — Scott A Browne
(74) *Attorney, Agent, or Firm* — Crowell & Moring LLP

(57) ABSTRACT

A wheel for a vehicle, in particular a motorcycle or a motor scooter includes a hub region which has at least some portions made of a fiber-reinforced plastic material. The hub region includes a recess in which an insert for connecting the wheel to a vehicle axle is placed. An isolation element which galvanically isolates the insert from the hub region is arranged between the hub region and the insert.

8 Claims, 2 Drawing Sheets

(52) U.S. Cl.
CPC ............ *B60B 2360/3412* (2013.01); *B60B 2360/3418* (2013.01); *B60B 2900/141* (2013.01); *B60Y 2200/12* (2013.01)

(56) References Cited

U.S. PATENT DOCUMENTS

2015/0284836 A1   10/2015  Liu et al.
2017/0282640 A1   10/2017  Jaeger et al.
2018/0186178 A1*  7/2018   Liu ..................... B60B 3/145

FOREIGN PATENT DOCUMENTS

| | | |
|---|---|---|
| DE | 20 2007 004 056 U1 | 6/2007 |
| DE | 10 2008 028 330 A1 | 1/2009 |
| DE | 10 2013 221 514 A1 | 4/2015 |
| DE | 10 2014 226 147 A1 | 6/2016 |
| DE | 10 2015 203 900 A1 | 9/2016 |
| JP | 56-75201 A | 6/1981 |
| JP | 59-67105 A | 4/1984 |
| JP | 1-215601 A | 8/1989 |
| KR | 10-2015-009485 A | 8/2015 |
| WO | WO 2009/093984 A2 | 7/2009 |
| WO | WO 2018/141679 A1 | 8/2018 |

OTHER PUBLICATIONS

German-language Written Opinion (PCT/ISA/237) issued in PCT Application No. PCT/EP2017/081978 dated Feb. 26, 2018 (five pages).

\* cited by examiner

WHEEL MADE OF FIBER-REINFORCED COMPOSITE MATERIAL AND PROVIDED WITH GALVANIC ISOLATION

CROSS REFERENCE TO RELATED APPLICATIONS

This application is a continuation of PCT International Application No. PCT/EP2017/081978, filed Dec. 8, 2017, which claims priority under 35 U.S.C. § 119 from German Patent Application No. 10 2017 203 172.7, filed Feb. 27, 2017, the entire disclosures of which are herein expressly incorporated by reference.

BACKGROUND AND SUMMARY OF THE INVENTION

The invention relates to a wheel for a vehicle, in particular for a motorcycle or a motor scooter a hub region that is formed at least partially from a fiber-reinforced plastic.

In order to save weight, great efforts are undertaken to be able to use lighter components in vehicles, in particular motor vehicles. Therefore, in recent years, fiber-reinforced plastics have been increasingly used.

This concept is also implemented in vehicle wheels, for example motorcycle wheels. The rim and spokes can in this case be manufactured entirely from fiber-reinforced plastic, in particular from carbon-fiber-reinforced plastic. Such a wheel arrangement is described for example in DE 10 2014 226 147 A1. In the hub region thereof, two metal inserts are embedded in the fiber-reinforced plastic on axially opposite sides of the wheel, said metal inserts serving for example for force transmission from a brake disk arranged on one side or two brake disks arranged on either side. The two spaced-apart inserts are introduced separately from either side of the wheel.

The object of the invention is to further improve a wheel, which is fiber-reinforced at least in the hub region, for a vehicle, in particular a motorcycle or a motorcycle-like vehicle.

Accordingly, a wheel for a vehicle, in particular for a motorcycle or a motor scooter, is provided, having a hub region that is formed at least partially from a fiber-reinforced plastic. The hub region has a cutout in which an insert for attaching the wheel to an axle of the vehicle is arranged, wherein an isolation element for galvanically isolating the insert from the hub region is arranged between the hub region and the insert.

The wheel is thus inherently suitable for a vehicle. Preferably, the vehicle can a motorcycle or a motorcycle-like vehicle, for example a motor scooter, the wheels of which are subjected to particularly high changes in speed or changes in torque. The wheel thus has a hub region, which is manufactured in one or more portions, preferably entirely, from fiber-reinforced plastic. Similarly, further portions of the wheel, for example the spokes and/or rim, can likewise be manufactured from the fiber-reinforced plastic. The hub region, the spokes and the rim are likewise preferably produced integrally from the fiber-reinforced plastic. Rather than the spokes, it is also possible for example for a disk-like element to be provided in the same way for the connection between the hub region and rim.

Depending on the type of mounting, the insert is provided to be connected to the axle of the wheel for conjoint rotation or in a rotatable manner. Moreover, the insert can be configured for fastening a drive pinion and/or a brake disk.

Furthermore, with the aid of the isolation element, galvanic isolation is created, which separates the insert and the hub region from one another in order to reduce or even completely prevent contact corrosion.

To this end, it is possible for example for the isolation element to be manufactured partially or entirely from plastic or fiber-reinforced plastic, wherein reinforcing fibers of the fiber-reinforced plastic comprise electrically nonconductive fibers, in particular glass fibers, aramid fibers, synthetic fibers or natural fibers.

For example, the isolation element can be embodied as an independent or separate component or as an isolating layer. If the isolation element is present as a separate component, it can be produced independently of the wheel and be inserted into the hub region or placed on the insert during assembly. In the case of the isolating layer, the isolation element can be created by applying the material used to, or winding it onto, the hub region or the insert in layers.

Furthermore, the insert can comprise a cylindrical or conical connecting portion for connecting to the isolation element. For example, the connection is provided by means of a lateral surface of the connecting portion. Optionally, an attachment portion is provided on an axial end face of the connecting portion. Said attachment portion can be configured for example in a disk-like manner and for the attachment of further vehicle elements, such as a brake disk or a drive pinion.

Moreover, the isolation element can have an annular portion, wherein a radially external surface of the annular portion is connected to the hub region. This means that the isolation element itself is formed in an annular manner or is formed in an annular manner at least in the one portion, in order to isolate the insert from the hub region. The connection to the hub region is configured preferably for conjoint rotation and can be provided by a material bond, a force fit and/or a form fit.

For example, the annular portion can be connected to the connecting portion of the insert by a radially internal surface. The radially internal surface is understood to be the surface that is directed inward in the radial direction of the wheel, i.e. in the direction of the axle of the wheel, and engages around the connecting portion, for example in a circumferential direction of the cylinder or cone.

Preferably, the insert and the isolation element are connected together by a form-fitting connection. In this way, a conjointly rotational and at the same time durable connection between the two elements can be provided for the transmission of torques.

For example, the form-fitting connection can comprise a toothing arrangement interlocking in a complementary manner that is formed on the radially internal surface of the isolation element and on the connecting portion of the insert.

In this case, the toothing arrangement interlocking in a complementary manner can be formed by a number of protuberances directed in a radial direction that engage in corresponding recesses. To this end, either the protuberances are assigned to the connecting portion and the recesses are assigned to the radially internal surface of the isolation element and/or the protuberances are assigned to the radially internal surface and the recesses are assigned to the connecting portion. This is understood as explicitly including the possibility of a mixed arrangement in which both a first number of protuberances and recesses are assigned to the surface of the isolation element and a second number of protuberances and recesses are assigned to the connecting portion.

According to one embodiment, the toothing arrangement interlocking in a complementary manner can be formed by an undulating, in particular sinusoidal, structure of the radially internal surface of the isolation element and of the connecting portion. This means that the "teeth" of the toothing arrangement are formed by arcuate protuberances that engage in likewise arcuate recesses formed in a complementary manner thereto. In order to create the sinusoidal shape, arcuate protuberances are arranged alternately next to arcuate recesses on each of the two components. On account of the undulating shape, local stress peaks can be avoided particularly effectively and easily.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
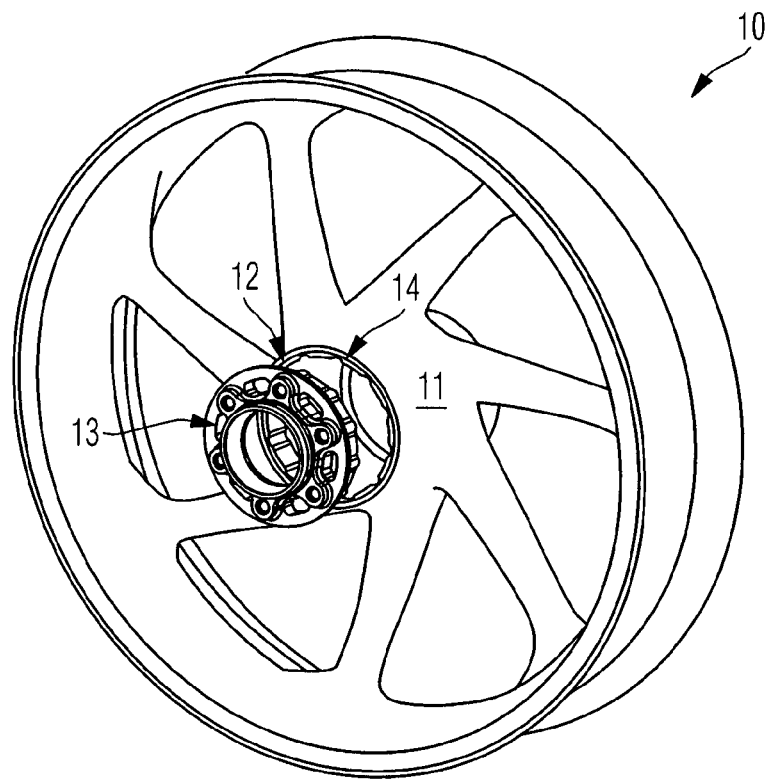
FIG. 1 shows an isometric view of a wheel according to an embodiment of the present invention.

FIG. 1 shows an isometric view of a wheel 10 for a vehicle (not illustrated), in particular for a motorcycle or a motor scooter, having a hub region 11 that is formed at least partially from a fiber-reinforced plastic. The hub region 11 has a cutout 12 in which an insert 13 for attaching the wheel 10 to an axle A of the vehicle can be arranged. Furthermore, an isolation element 14 for galvanically isolating the insert 13 from the hub region 11 is arranged between the hub region 11 and the insert 13 (at least in the assembled state according to FIG. 2).

Figure 2:
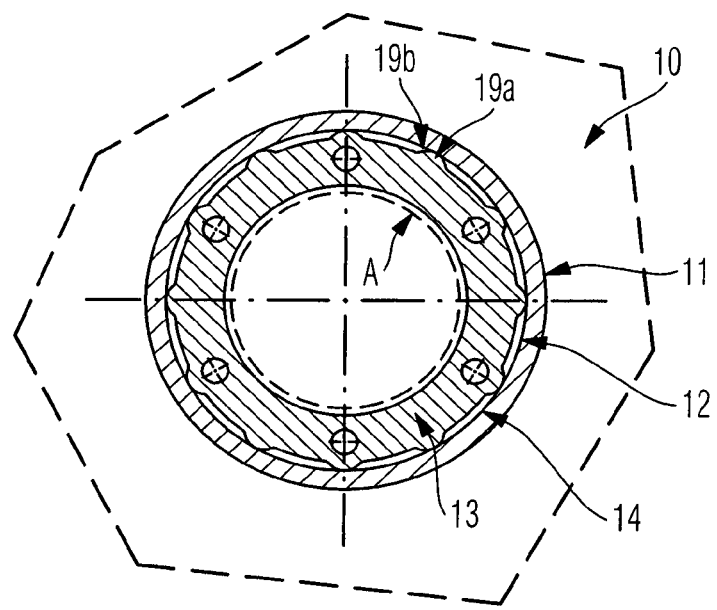
FIG. 2 shows an axial side view of a hub region of the wheel according to FIG. 1.

FIG. 2 shows a more detailed side view of the hub region 11 according to FIG. 1, wherein the insert 13 for attaching the wheel 10 to the axle A of the vehicle is arranged in the cutout 12 in the hub region 11. Furthermore, the isolation element 14, arranged between the hub region 11 and the insert 13, for galvanically isolating the insert 13 from the hub region 11 is discernible. For example, using this arrangement, the fiber-reinforced plastic of the hub region 11 can comprise carbon fibers and the insert 13 can be manufactured partially or entirely from metal material, with the result that contact corrosion between said elements 11, 13 can be avoided or at least reduced. To this end, the isolation element 14 is manufactured partially or entirely from plastic or fiber-reinforced plastic, wherein reinforcing fibers of the fiber-reinforced plastic comprise electrically nonconductive fibers, in particular glass fibers, aramid fibers, synthetic fibers or natural fibers.

Figure 3:
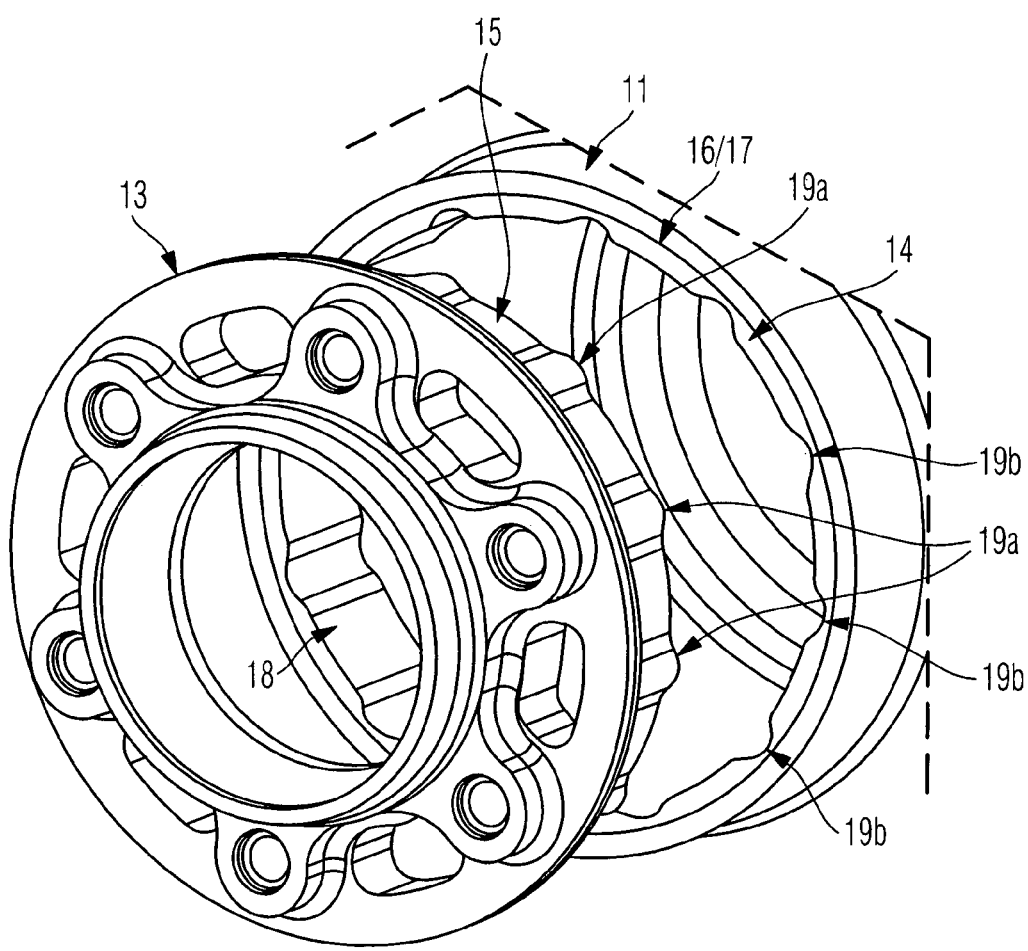
FIG. 3 shows the hub region according to FIG. 2 in a partially exploded view.

FIG. 3 likewise shows the insert 13 and the isolation element 14 for the wheel 10 according to FIGS. 1 and 2 in an enlarged illustration. According thereto, the insert 13 comprises, in the illustrated embodiment, a cylindrical connecting portion 15 for connecting to the isolation element 14. The connecting portion 15 has to this end a lateral surface facing radially outward (in a direction away from the axle of the wheel 10), which the isolation element 14 impinges upon. Alternatively, and therefore not illustrated here, the connecting portion can have a conical shape and likewise be formed by the corresponding lateral surface.

Moreover, the isolation element 14 has an annular portion 16, wherein a radially external surface 17 of the annular portion 16 is provided for connecting to the hub region 11. The assembled state is illustrated in FIG. 2.

In addition, the annular portion 16 of the isolation element 14 is connectable (FIGS. 1 and 2) or connected (FIG. 2) to the connecting portion 15 of the insert by a radially internal surface 18 by a form-fitting connection.

The form-fitting connection comprises a toothing arrangement 19 interlocking in a complementary manner that is formed on the radially internal surface 18 of the isolation element 14 and on the connecting portion 15 of the insert 13, or on the lateral surface thereof.

The toothing arrangement 19 interlocking in a complementary manner is formed by a number of protuberances 19a directed in a radial direction that engage in corresponding recesses 19b, wherein the protuberances 19a are assigned to the connecting portion 15 and the recesses 19b are assigned to the radially internal surface 18 of the isolation element 14. Of course, a reverse assignment is likewise possible, which is characterized in that the protuberances 19a are assigned to the radially internal surface 18 and the recesses 19b are assigned to the connecting portion 15. Mixed arrangements are likewise possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel for a vehicle, comprising:
a hub region formed at least partially from fiber-reinforced plastic and having a cutout therein;
an insert configured to attach the wheel to an axle of the vehicle; and
an isolation element configured to be located in the cutout concentrically between the insert and the hub region,
wherein
the isolation element is configured to galvanically isolate the insert from the hub region,
the insert includes a cylindrical or conical connecting portion configured to engage a corresponding surface of the isolation element,
the isolation element includes an annular portion having a radially external surface adjacent to a radially inner surface of the hub region cutout,
the corresponding surface of the insert is configured to engage a radially internal surface of the annular portion,
the insert and the isolation element engage one another by a form-fitting connection, and
the form-fitting connection includes a toothing arrangement interlocking in a complementary manner that is formed on the radially internal surface of the isolation element and on the connecting portion of the insert.

2. The wheel according to claim 1, wherein
the wheel is a motorcycle or motor scooter wheel.

3. The wheel according to claim 1, wherein
the fiber-reinforced plastic of the hub region includes carbon fibers, and
the insert is formed partially or entirely from metal.

4. The wheel according to claim 3, wherein
the isolation element is formed partially or entirely from plastic or fiber-reinforced plastic, and reinforcing fibers of the fiber-reinforced plastic of the isolation element include electrically nonconductive fibers.

5. The wheel according to claim 4, wherein the nonconductive fibers are glass fibers, aramid fibers, synthetic fibers, natural fibers, or a combination thereof.

6. The wheel according to claim 1, wherein the toothing arrangement interlocking in a complementary manner is formed by a plurality of protuberances directed in a radial direction that engage in corresponding recesses, and either the protuberances are on to the connecting portion and the recesses are on the radially internal surface of the isolation element, the protuberances are on to the radially internal surface of the isolation element and the recesses are on the connecting portion, or the protuberances and the recesses are arranged in a complementary manner on both the radially internal surface of the isolation element and the connecting portion.

7. The wheel according to claim 6, wherein the toothing arrangement is formed by a complementary undulating structure of the radially internal surface of the isolation element and of the connecting portion.

8. The wheel according to claim 7, wherein the undulating structure is sinusoidal.

* * * * *